(12) United States Patent
Koen

(10) Patent No.: US 7,940,173 B2
(45) Date of Patent: *May 10, 2011

(54) DYNAMICALLY CONFIGURABLE WIRELESS DEVICE

(75) Inventor: Robert John Koen, Vancouver (CA)

(73) Assignee: WebTech Wireless Inc., Burnaby, BC (CA)

( * ) Notice: Subject to any disclaimer, the term of this patent is extended or adjusted under 35 U.S.C. 154(b) by 97 days.

This patent is subject to a terminal disclaimer.

(21) Appl. No.: 12/453,195

(22) Filed: May 1, 2009

(65) Prior Publication Data

US 2009/0273469 A1 Nov. 5, 2009

(51) Int. Cl.
*G08B 1/08* (2006.01)
(52) U.S. Cl. .................... 340/539.13; 340/969; 340/988
(58) Field of Classification Search .................. 340/989, 340/539.13, 573.1, 992, 994, 995.1–995.28, 340/426.19, 426.18, 426.1; 701/20–226
See application file for complete search history.

(56) References Cited

U.S. PATENT DOCUMENTS

| | | | |
|---|---|---|---|
| 5,311,197 A * | 5/1994 | Sorden et al. .................. 342/457 |
| 5,974,312 A | 10/1999 | Hayes, Jr. et al. | |
| 6,031,828 A | 2/2000 | Koro et al. | |
| 6,295,449 B1 | 9/2001 | Westerlage et al. | |
| 6,314,270 B1 | 11/2001 | Uchida | |
| 6,862,524 B1 | 3/2005 | Nagda | |
| 6,922,547 B2 | 7/2005 | O'Neill et al. | |
| 6,934,544 B2 | 8/2005 | Cooper | |
| 7,196,621 B2 | 3/2007 | Kochis | |
| 7,339,469 B2 | 3/2008 | Braun | |
| 7,408,502 B2 | 8/2008 | Percy et al. | |
| 7,451,042 B2 | 11/2008 | Uyeki et al. | |
| 7,480,563 B2 * | 1/2009 | Ichimura ....................... 701/207 |
| 2003/0227395 A1 * | 12/2003 | Zeineh .......................... 340/988 |
| 2004/0012506 A1 * | 1/2004 | Fujiwara et al. ........... 340/995.1 |
| 2006/0061469 A1 * | 3/2006 | Jaeger et al. ............. 340/539.13 |
| 2006/0109106 A1 * | 5/2006 | Braun ...................... 340/539.13 |
| 2006/0187026 A1 * | 8/2006 | Kochis ..................... 340/539.13 |
| 2006/0220842 A1 * | 10/2006 | Breed ....................... 340/539.13 |
| 2006/0238347 A1 * | 10/2006 | Parkinson et al. ......... 340/572.4 |
| 2007/0156324 A1 * | 7/2007 | Percy et al. .................. 701/117 |
| 2007/0219715 A1 * | 9/2007 | Uyeki et al. ................. 701/209 |
| 2008/0094209 A1 * | 4/2008 | Braun ...................... 340/539.13 |
| 2008/0186162 A1 * | 8/2008 | Rajan et al. .............. 340/539.13 |

FOREIGN PATENT DOCUMENTS

| | | |
|---|---|---|
| WO | WO/99/34339 | 7/1999 |
| WO | WO/00/56016 | 9/2000 |
| WO | WO/00/70889 | 11/2000 |
| WO | WO/01/03414 | 1/2001 |

* cited by examiner

*Primary Examiner* — George A Bugg
*Assistant Examiner* — Hoi C Lau
(74) *Attorney, Agent, or Firm* — Mark Yang

(57) ABSTRACT

A wireless device for facilitating for GPS-based asset tracking via a wireless communications network and a centralized management system. The wireless device includes dynamically configurable event profiles which allow the wireless device to be dynamically reconfigured and to perform certain actions based on a dynamically configurable combination of received events.

23 Claims, 6 Drawing Sheets

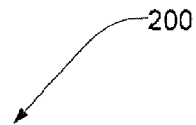

PROFILE TABLE ENTRY FORMAT

202 ~ PROFILE NUMBER — Entry Number
204 ~ T_WORD — Binary word indicating triggers used in the entry
206 ~ T_MASK — Binary word indicating sufficient and necessary triggers
208 ~ P_HYSTERESIS — Minimum duration all triggers must be active to activate profile
210 ~ COMMANDS — Device configuration commands associated with the profile
212 ~ TIMER_START — Hysteresis timer start time
214 ~ P_ACTIVE — Boolean flag indicating if profile is currently active

*FIG. 4*

DYNAMICALLY CONFIGURABLE WIRELESS DEVICE

FIELD OF THE INVENTION

This invention relates to the field of wireless asset tracking and fleet operations management.

BACKGROUND OF THE INVENTION

Ever since the advent of ubiquitous wireless networks and GPS satellites, specialized wireless devices have been installed in vehicles to facilitate fleet operations management and in virtually anything that moves or is moved to enable asset tracking. In the art, such devices are commonly called "locator devices", referencing their basic functionality of locating and reporting a physical position of a vehicle, trailer or any asset. However, functionality of the locator devices is not limited to merely location tracking. The locator devices interface with many kinds of other devices and systems to collect information and data and to control operation of external systems. Although typically intended to be used with wireless networks to communicate with a centralized management system, the locator devices are also typically capable of independent operation in an event of a network failure, for example. In such situations, instead of immediate reporting, the locator devices typically operate according to pre-defined rules and/or store the information they gather in local memory.

When used by fleet operators, the locator devices provide a wealth of useful functions such as efficient vehicle scheduling, dispatching and location management, monitoring driver behaviour and compliance with traffic rules and government regulations, fuel tax recovery, detailed time tracking, and enhanced driver services such as real-time mapping, Internet access, credit card processing, and many others.

In other applications, locator devices of all kinds are often used to track high-value assets ranging from cars and construction equipment to pallet shipments and even small packages.

The use of locator devices in such a variety of applications naturally imposes a myriad of different requirements, both physical (e.g., size, power consumption, processing speed, storage capacity, etc.), and operational (e.g., software functionalities for monitoring, tracking, recording, controlling, etc.). Furthermore, even a single locator device, used for a single application, while having a single set of physical specifications, may have different functional requirements depending on the particular mode or location of use.

To date, manufacturers of the locator devices have not adequately overcome these limitations. Specifically, while varying physical requirements have been usually met by designing the locator devices for a specific market (for example to be installed in vehicles or containers), the only solution to the varying functional requirements has been to develop custom software and firmware loads for each customer and/or application. There are many disadvantages to that solution: design and support costs requirement to develop and maintain a multitude of software streams; slow request-to-implementation time as any requested feature has to be integrated into existing software and the entire fleet of devices has to be upgraded; and lack of flexibility as each locator device can only operate a single feature set at any one time. Furthermore, this cumbersome approach did not solve the issue of a single locator device, which may have different operational profiles not based on the customer who is using it, but on a more transient quality such as where the locator device may be located or what the vehicle or asset with that locator device is doing at that time.

SUMMARY OF THE INVENTION

A method of dynamically operating a locator device, including the steps of defining a plurality of events where each of the events represents an operational status of the locator device. The method including the step of defining a plurality of triggers where each of the triggers is a dynamically configurable contemporaneously occurring combination of the events and defining a plurality of event profiles where each of the event profiles is a user-configurable dynamic association between one of the triggers; and a dynamically configurable set of device commands. The method further including responding to a contemporaneously occurring subset of the events by evaluating the contemporaneously occurring subset of the events against the triggers of each of the event profiles and activating one of the event profiles by processing the set of device commands corresponding to the event profile whenever the contemporaneously occurring subset of the events corresponds to the trigger of the event profile A dynamically operable locator device comprising a definition of a plurality of events where each of the events represents an operational status of the locator device, a definition a plurality of triggers where each of the triggers is a dynamically configurable contemporaneously occurring combination of the events, and a definition a plurality of event profiles where each of the event profiles is a user-configurable dynamic association between one of the triggers and a dynamically configurable set of device commands. The device further comprising means for responding to a contemporaneously occurring subset of the events by evaluating the contemporaneously occurring subset of the events against the triggers of each of the event profiles and means for activating one of the event profiles by processing the set of device commands corresponding to the event profile whenever the contemporaneously occurring subset of the events corresponds to the trigger of the event profile.

BRIEF DESCRIPTION OF THE DRAWINGS

A better understanding of the present invention can be obtained when the following detailed description of the preferred embodiment is considered in conjunction with the following drawings, in which:

FIG. 4 is a high level diagram illustrating a format of entries in a Profile Table stored in the dynamically configurable locator device shown in FIG. 2.

DETAILED DESCRIPTION OF THE PREFERRED EMBODIMENT

Notice Regarding Copyrighted Material

A portion of the disclosure of this patent document contains material which is subject to copyright protection. The copyright owner has no objection to the facsimile reproduction by anyone of the patent document or the patent disclosure as it appears in the Patent and Trademark Office file or records, but otherwise reserves all copyright rights whatsoever.

Wireless Communication System

Figure 1:
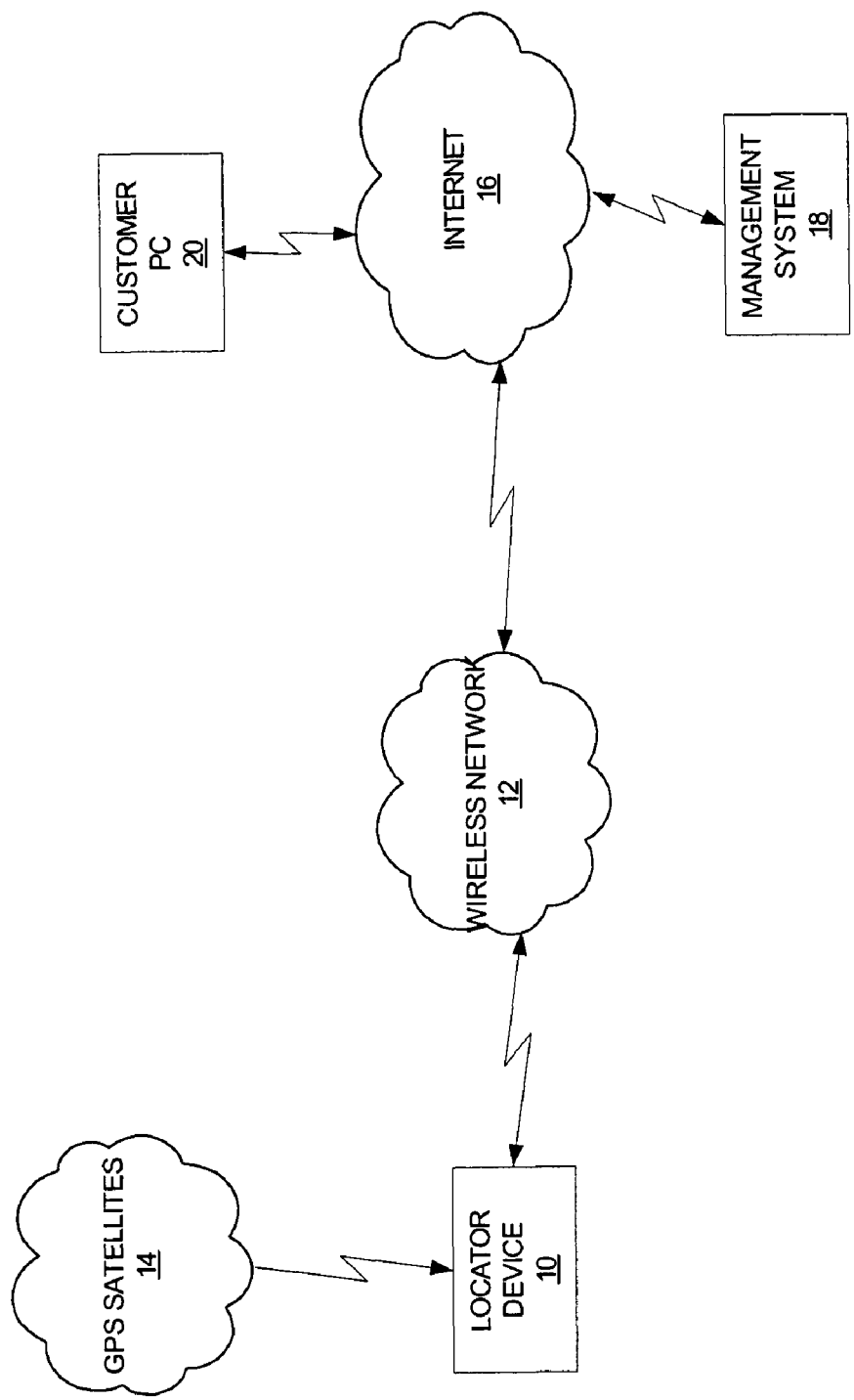
FIG. 1 is a high level diagram of a prior art wireless communication system.

Referring to FIG. 1, a wireless communication system according to one embodiment of the invention is shown. The wireless communication system comprises a plurality of locator devices 10, a wireless network 12, a plurality of GPS satellites 14, the Internet 16, a Management System 18, and a plurality of customer computers 20. The locator device 10 is a wireless communication device, commonly installed in a vehicle or a trailer to provide location-based communication services such as, for example, asset tracking and reporting, Internet access, voice and text communications, and telemetry monitoring or control. Devices such as the locator devices 10, albeit not containing the novel elements recited and claimed herein, are well known in the art. For example, WebTech Wireless Inc., of Burnaby, British Columbia, produces and markets several models of the locator devices 10 under the trademark WebTech Locator™. In one embodiment, the locator devices 10 obtain position information from the GPS satellites 14 via integrated or external GPS modems and antennas (not shown). Methods and apparatuses for obtaining GPS-based location information are well known in the art. For example, WebTech Locator™ devices mentioned above include integrated GPS modems. The locator devices 10 are connected to the wireless communication network 12, which may be any available cellular, satellite, microwave or radio communication network based on any communication standard such as, for example, GSM, GPRS, CDMA, CDPD or WiFi. Modes and methods of interconnection to such wireless communication networks are well known in the art and are not further described herein. The Management System 18 is also connected to the wireless network 12 via the Internet 16. The Management System 18 provides portal-based locator device 10 management functions, such as remote device configuration and upgrades, data bridging, device monitoring, tracking and reporting, to Management System subscribers. The Management System 18 is well known in the art and is not described further herein. For example, WebTech Wireless Inc. of Burnaby, British Columbia, produces and markets a Management System under the name Quadrant Vehicle Services System™. In order to utilize the locator device 10 management functions provided by the Management System 18, the subscribers of the Management System 18 access the Management System from PCs 20 using web browsers (not shown) or any another remote access method known in the art Locator Device Referring now to FIG. 2, the locator device 10 is shown in detail at 99 according to one embodiment of the invention. The locator device 10 comprises a microprocessor 100, an I/O interface 110, a persistent memory 150, a RAM 160, a parameter memory 170, and a Subscriber Identity Module (SIM) 180. The functionality of these modules is described below.

I/O

Figure 2:
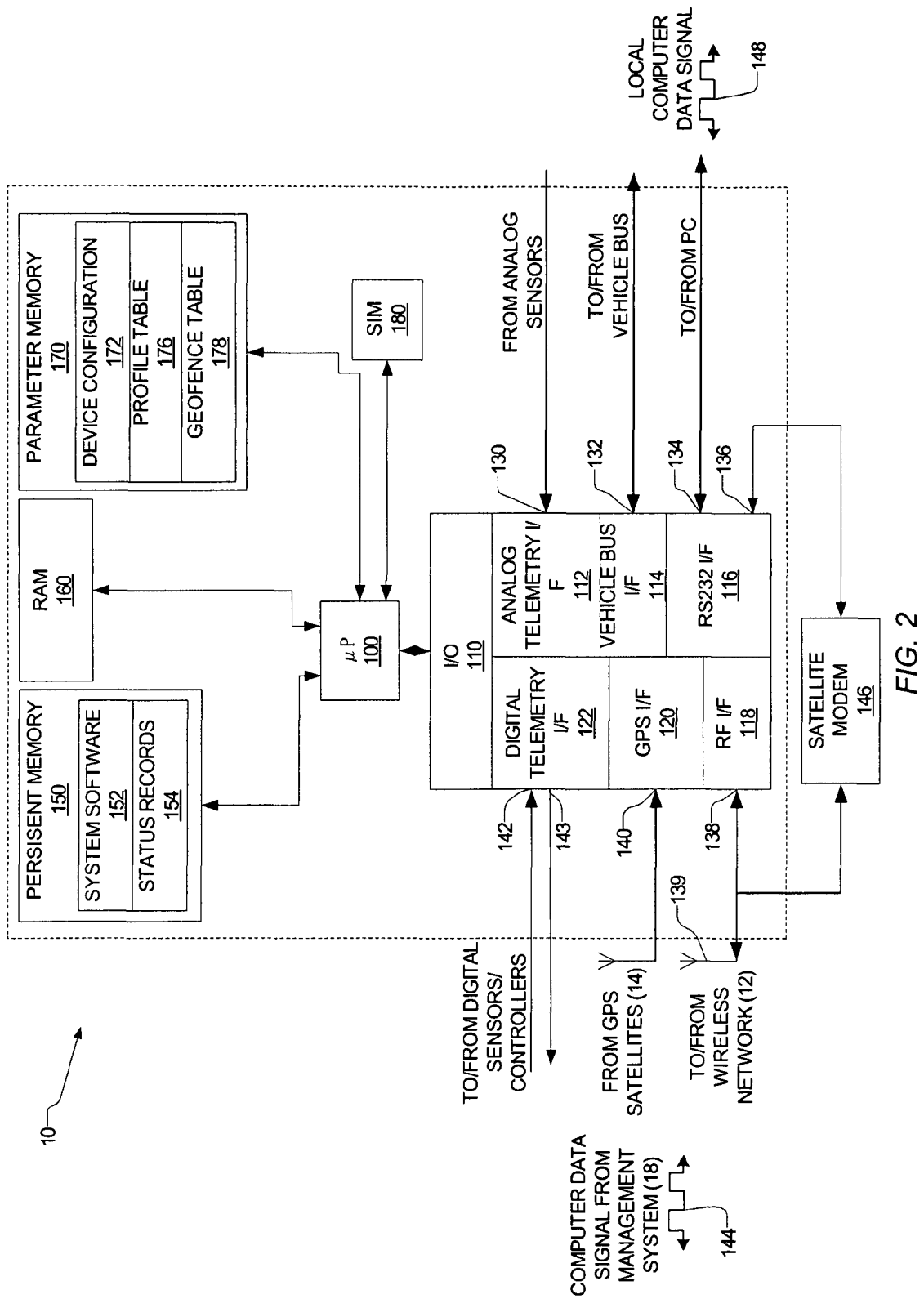
FIG. 2 is a block diagram of a dynamically configurable locator device according to one embodiment of the invention.

Still referring to FIG. 2, the I/O interface 110 enables communications between the locator device 10 and other devices, integrated or external. The I/O interface 110 includes a plurality of telemetry interfaces. Specifically, I/O interface 110 includes an analog telemetry interface 112, a digital telemetry interface 122, a vehicle bus interface 114, an RS232 interface 116, a radio (RF) interface 118, and a GPS interface 120. The analog telemetry interface 112 provides a connection 130 to a plurality of analog sensors (not shown) which generate variable voltage signals to indicate their status. A common example of an analog sensor is a thermometer (not shown), which outputs temperature measurements as a voltage-graduated analog signal. The analog telemetry interface 112 further includes an analog-to-digital (A/D) converter (not shown), which converts received analog signals to their digital representations that can be further processed by the microprocessor 100. The operation of A/D converters is well-known in the art and is not described further herein. The digital telemetry interface 122 provides a bidirectional connection to devices which generate, or are controlled by, digital signals. More specifically, the digital telemetry interface 122 includes a plurality of digital inputs 142 and plurality of digital outputs 143. A common example of a device connected to the digital input 142 is a door-mounted sensor which generates a logic HIGH signal when a door opens. A common example of a device connected to the digital output 143 is a relay which controls some operational aspect of a vehicle in which it is installed, for example, disabling the vehicle's fuel pump upon receiving a logic HIGH signal from the digital telemetry interface 122. The vehicle bus interface 114 provides a bidirectional connection 132 to various vehicle systems, for example J1587/J1708, OBD II or CANBUS compliant systems.

Still referring to FIG. 2, the GPS interface 120 enables receiving GPS location information from the GPS satellites 14 through a GPS antenna 141. A person skilled in the art will appreciate that the GPS interface 120 may comprise an integrated or external GPS receiver and may further utilize any appropriate GPS antenna type. For example, the WebTech 6000 Locator™, from WebTech Wireless Inc. of Burnaby, British Columbia, integrates a GPS receiver and is typically equipped with an external active GPS antenna. The RF interface 118 provides a wireless connection 118 to the wireless network 12 via a radio antenna 139. For example, the WebTech 6000 Locator™ device integrates a GSM/GPRS modem which can connect to any available GSM/GRPS network. The RF interface 118 is further used to receive a remote computer data signal 144 from the Management System 18. The RS232 interface 116 provides a primary serial connection 134 and a secondary serial connection 136. The primary serial connection 134 typically connects to a computer or a navigation system co-located with the locator device 10. The primary serial connection 134 can be used for a variety of purposes, such as for local management of the locator device 10 via a laptop connected thereto that generates a local computer data signal 148 containing device commands. The meaning of the term 'device commands' will be described below. In another example, the primary serial connection 134 can be connected to an in-vehicle navigation system to output thereto mapping and location information received from the Management System 18 and the GPS satellites 14 via the RF interface 118 and the GPS interface 120, respectively. The secondary serial connection 136 can be used to connect to a communication device, such as a satellite modem 146, to provide a primary or a backup connection to the wireless network 12 via the radio antenna 139 or another antenna (not shown) appropriate for the specific type of wireless network 12 and the connection method used. In one embodiment of the invention, should the RF interface 118 or the primary wireless network 12 become unavailable, the secondary serial connection 136, via the satellite modem 146, can be used to a re-establish a connection to the Management System 18 via a satellite communication network.

A person skilled in the art will appreciate that the interfaces comprising the I/O 110 described above are merely examples of possible configurations of the locator device 10. A variety of interfaces, connections, and signals may be implemented in the locator device 10 as may be appropriate for a particular application.

Memory

Still referring to FIG. 2, the persistent memory 150 is a non-volatile memory which contains System Software 152 and a database of status records 154. The database of status records 154 is used to log and store all measurements and events received, processed or generated by the locator device 10. The number of status records stored in the database of status records 154 is limited only by the size of the non-volatile persistent memory 150 installed in the locator device 10. The System Software 152 comprises a collection of computer encoded instructions, which direct the microprocessor 100 to perform functions of the locator device 10. The System Software 152 will be described in further detail below in reference to FIG. 3 and FIG. 6.

Still referring to FIG. 2, the RAM 160 is used by the locator device 10 to store various information of a temporary nature. Operation of the RAM 160 is well known in the art and will not be further described herein.

Still referring to FIG. 2, the parameter memory 170 is a non-volatile memory which contains a device configuration 172, a Profile Table 176, and a Geofence Table 178. The device configuration 172 is used to store a plurality of operational parameters which define all dynamically configurable operational aspects of the locator device 10. A person skilled in the art will appreciate that the particular operational parameters for each type of the locator device 10 depend on the specific implementation and functionality of the locator device. The device configuration 172 can also be modified by the Management System 18, by a user operating a terminal connected to the primary serial connection 134, or by the System Software 152 in response to occurrence of certain events. The Profile Table 176 contains a plurality of event profiles which are used to dynamically respond to events by performing certain actions or changing the device configuration 172. The meaning of the terms 'events' and 'actions' will be described below.

Still referring to FIG. 2, the Geofence Table 178 defines a plurality of geofences configured on the locator device 10. A geofence is a virtual boundary that can be configured on the locator device 10 using GPS co-ordinates. Geofences are typically configured on the locator device 10 by using device commands that are automatically generated by a software geofence configuration tool (not shown). A geofence can define any area, for example, a work site, customer site, yard, home depot, area that should not be traveled through (exclusion fence), or any other type of area. As will be described further below, when, based on the location information received from the GPS satellites 14, the locator device 10 enters or leaves a geofence area, an event is generated and actions can be taken or device configuration 172 altered. There are generally three types of geofences that can be configured on the locator device 10 in the Geofence Table 178. The first type is a polygon geofence created by drawing a polygon enclosing a desired area on a map. The second type is a route geofence, a virtual boundary created along a designated route, which may span several hundred miles or kilometers. For example, the route geofence can be created along a tow truck operator's "Beat", or an armored truck route along a stretch of highway between cities. The third type is a circular geofence that is created by defining a center location and a radius.

Still referring to FIG. 2, the SIM 180 is used to store information that identifies the locator device 10 to the wireless network 12. The use of SIM 180 is well known in the art and will not be further described herein. A person skilled in the art will appreciate that, depending on the type of the wireless network 12 used with the particular locator device 10, a different method for identification of the locator device to the wireless network may be used.

A person skilled in the art will appreciate that while the described embodiment uses the microprocessor 100 and memory modules 150, 160, 170 and 180, the locator device 10 may also be implemented using FPGA or ASIC technologies as alternative methods of encoding, storing and/or processing instructions which define the locator device operation. The choice of technology, i.e., microprocessor, FPGA, ASIC, virtual machine, or any other, will depend on the particular device functionality desired and on the cost, manufacturing, and other application constraints.

System Software

Figure 3:
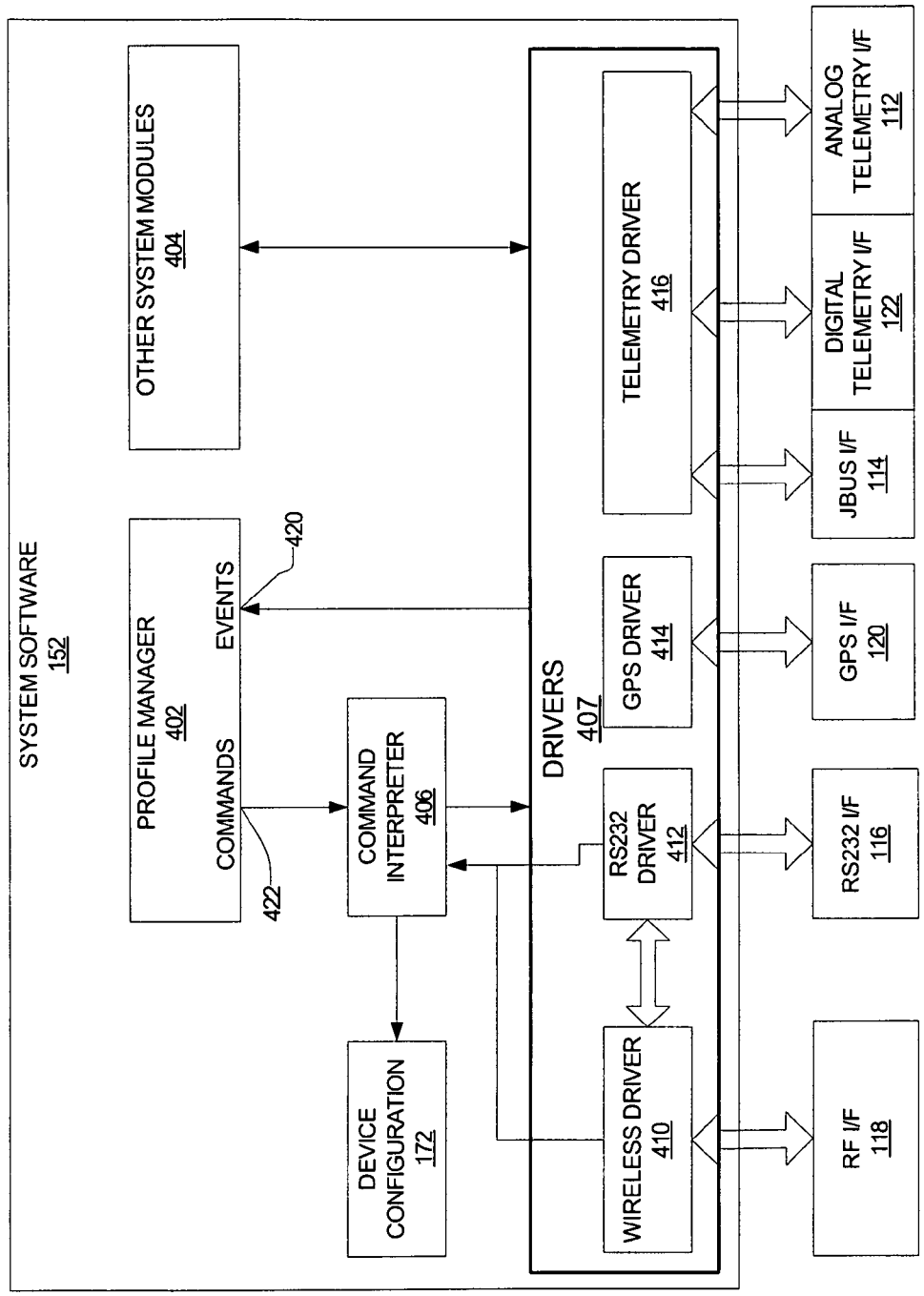
FIG. 3 is a block diagram of a System Software module of the dynamically configurable locator device shown in FIG. 2.

Referring to FIG. 3, key aspects of the System Software 152 are shown in greater detail according to one embodiment of the invention. The System Software 152 comprises a number of functional components including a Profile Manager 402 and Other System Modules 404 for implementing the functionality of the locator device 10, a Command Interpreter 406 for managing the operation of the locator device, and Drivers 407 for controlling the interfaces 112, 116, 118, 120 and 122 of the I/O 110. The Profile Manager 402 receives events from the drivers 407 via an event input 420, processes the events according to triggers (as will be described below) to determine what event profile needs to be activated and what device commands need to be output to the Command Interpreter 406 via a command output 422. The Command Interpreter 406 provides a management interface to the locator device 10 by interpreting device commands to cause the locator device to perform actions or to change the device configuration 172 as specified in the commands. The device commands interpreted by the Command Interpreter 406 can be received in the local computer data signal 148 from a local computer terminal, in the remote computer data signal 144 from the Management System 18, or via the command output 422 from the Profile Manager 402. The operation of the Profile Manager 402 and the meaning of the terms 'events', 'triggers', 'event profiles' and 'actions' will be described below. Well known aspects of the locator device 10 are implemented in the Other System Modules 404 and are not further described herein.

Drivers

Still referring to FIG. 3, in the described embodiment of the invention, the drivers 407 include a wireless driver 410, an RS232 driver 412, a GPS driver 414, and a telemetry driver 416. The wireless driver 410 enables communications to/from the wireless network 12 via the RF interface 118. In addition to enabling network-specific communication functions, the wireless driver 410 further enables transmitting and receiving the remote computer data signal 144 to and from the Management System 18 via the wireless network 12 (see FIG. 2). Where the remote computer data signal 144 contains device commands, they are forwarded by the wireless driver 410 to the Command Interpreter 406. The RS232 driver 412 enables communications to and from a local computer or data terminal via the primary serial connection 134, and to/from a satellite network via the satellite modem 146 connected to the secondary serial connection 136 as previously described in reference to FIG. 2. As device commands may be received via either of the serial connections 134 and 136, the RS232 driver 412 forwards any received device commands to the Command Interpreter 406. The GPS driver 414 enables communication with the GPS interface 120 for receiving position information from the GPS satellites 14 as was previously described in reference to FIG. 2. The telemetry driver 416 enables communication to and from the vehicle bus interface 114, the digital telemetry interface 122 and the analog telemetry interface 112 and devices connected thereto. The telemetry driver 416 controls all operational aspects of these interfaces (112, 114, 122) enabling digital and analog output, and analog input via the A/D converter described above in reference to FIG. 2. In some embodiments of the invention, the telemetry driver 416 may further enable advanced functions such as connection to a digital handset for voice communications through the locator device 10. A person skilled in the art will appreciate that the drivers 407 described herein are well known in the art and do not limit the function or the spirit of the invention as they may be implemented to enable any functionality required for a particular application of the locator device 10.

Events, Triggers, Configuration Commands and Profiles

As described above, the Profile Manager 402 and the Command Interpreter 406 modules of the System Software 152 control the operation of the locator device 10 by processing event profiles, events, triggers, device commands, configuration parameters and actions. The terms 'event profiles', 'events', 'triggers', 'device commands', 'configuration parameters' and 'actions' in the context of this embodiment, are explained below.

An event profile is a user-configurable dynamic association between (a) events and (b) device commands that represent actions and/or configuration parameters. More specifically, in the described embodiment, event profiles are stored in the Profile Table 176 in the format that will be described below in reference to FIG. 4. Each event profile has a trigger, which is a dynamically configurable combination of events against which contemporaneous occurring events are evaluated to determine whether the event profile should become active. Each event profile also has a dynamically configurable collection of device commands which are output to the Command Interpreter 406 to implement the actions and/or configuration parameters associated with the active profile.

An event is an operational condition of the locator device 10. A list of events, according to one embodiment of the invention, is shown in Table 1 below. By way of explanation, it can be noted that geofence crossing events (6-11 and 14-19) can correspond to either polygon or route geofences stored in the Geofence Table 178. In this embodiment of the invention, a single circular geofence is implemented and its information is also stored in the Geofence Table 178. However, a person skilled in the art will appreciate that any number of any type of geofences may be configured on the locator device 10 limited only by the specifications of the device itself and requirements of a specific application. As will be described further below, the Profile Manager 402 accepts events as inputs and evaluates them according to event profile triggers to determine which event profile stored in the Profile Table 176 should be activated.

A trigger is a dynamically configurable Boolean combination of events, which, in one embodiment of the invention, will cause the Profile Manager 402 to activate an event profile stored in the Profile Table 176. The triggers may be dynamically configured, i.e., the combination of events defined by device commands issued to the Command Interpreter 406 by (a) users via the primary serial connection 136 or via the Management System 18, or (b) issued automatically by the Profile Manager 402 as a consequence of event processing. A person skilled in the art will appreciate that non-Boolean logic for defining dynamically configurable combinations of events (e.g., fuzzy logic or other forms of sequential or combinatorial logic) may be used for specific applications, where advantageous.

A device command is a string, formatted according to a pre-defined syntax, which conveys operational instructions and/or configuration parameters to the Command Interpreter 406 in order to make the locator device 10 perform an action or to change the device configuration 172.

An action represents a function(s) of the locator device 10, which can be implemented via one or more device command. For example, an action may be turning on a specific telemetry output or sending an alarm to the in-vehicle navigation system connected to the primary serial interface 134.

In the context of this invention, configuration parameters are discrete aspects of the device configuration 172 which control specific operational aspects and/or functions of the locator device 10. For example, a configuration parameter may specify the frequency with which the locator device 10 will report to the Management System 18 or the mode of communication to be used to communicate with the Management System 18—the RF interface 118 or the satellite modem 146 connected to secondary serial connection 136 as was described above in reference to FIG. 2. Configuration parameters may also specify entries in the Profile Table 176 or Geofence Table 178.

Further details of operation of event profiles as well as some examples will be described below.

TABLE 1

| Events Number | Event Description |
| --- | --- |
| 1 | PPP Context is inactive - Cellular Modem or wireless network is down |
| 2 | SMS - PPP context is active, but there is no host connection |
| 3 | TCP - PPP context is active, and there is a host connection |
| 4 | Circular geofence crossed into |
| 5 | Circular geofence crossed out of |
| 6 | geofence 1 crossing into |
| 7 | geofence 1 crossing out of |
| 8 | geofence 2 crossing into |
| 9 | geofence 2 crossing out of |
| 10 | geofence 3 crossing into |
| 11 | geofence 3 crossing out of |
| 12 | GPS fix occurs |
| 13 | GPS nofix occurs |
| 14 | geofence 4 crossing into |
| 15 | geofence 4 crossing out of |
| 16 | geofence 5 crossing into |
| 17 | geofence 5 crossing out of |
| 18 | geofence 6 crossing into |
| 19 | geofence 6 crossing out of |
| 20-35 | Physical Input 0-15 ON |
| 36-51 | Physical Input 0-15 OFF |
| 52-67 | Physical Output 0-15 ON |
| 68-83 | Physical Output 0-15 OFF |
| 84-99 | Virtual Input 0-15 ON |
| 100-115 | Virtual Input 0-15 OFF |
| 116-131 | Virtual Output 0-15 ON |
| 132-147 | Virtual Output 0-15 OFF |
| 148 | Main Power OFF |
| 149 | Battery Power ON |
| 150 | Low Battery |
| 151 | Timer 1 expired |
| 152 | Timer 1 running |
| 153 | Timer 2 expired |
| 154 | Timer 2 running |
| 155 | Timer 3 expired |

TABLE 1-continued

| Events Number | Event Description |
| --- | --- |
| 156 | Timer 3 running |
| 157 | In radio coverage |
| 158 | Out of radio coverage |
| 159 | Out of preferred wireless network |

Table Formats

Referring to FIG. 4, a format of event profile entries in the Profile Table 176 is shown generally at 200. Each Profile Table 176 entry comprises a P_NUM field 202, a T_WORD field 204, a T_MASK field 206, a P_HYSTERESIS field 208, a COMMANDS field 210, a TIMER_START field 212, and a P_ACTIVE flag 214. The P_NUM field 202 contains a priority number of the event profile described in the entry. Profile Table 176 entries are evaluated in a sequential manner starting with an event profile with the highest number. A default event profile contains 0 in the P_NUM field 202 and is activated when the received events do not correspond to the triggers of any other event profile in the Profile Table 176. The T_WORD field 204 defines a set of events which are evaluated for the event profile. Each bit of T_WORD field 204 corresponds to an event number, as can be seen in, for example, Table 1. The T_MASK field 206 defines which events contained in the T_WORD field 204 are sufficient events and which ones are necessary events. Sufficient events will cause an event profile to be activated if any of sufficient events are occurring at the time of the evaluation. Necessary events will only cause an event profile to be activated if all of the necessary events are occurring at the time of the evaluation. A trigger for an event profile is defined by the combination of the contents of the T_WORD field 204 and the T_MASK field 206, in effect, a Boolean expression for evaluating events. The P_HYSTERESIS field 208 contains a numeric value defining a minimum duration during which the events (any sufficient or all necessary) defined in the T_WORD field 204 must be contemporaneously occurring to activate an event profile to which they correspond. The COMMANDS field 210 contains a set of device commands which are output to the Command Interpreter 406 when an event profile is activated. The TIMER_START field 212 is populated with a timestamp indicating a time when any of the sufficient or all of the necessary events were found to be occurring and a hysteresis timer (not shown) for the event profile was started. The P_ACTIVE flag 214 is a Boolean flag indicating that the event profile is currently active, i.e., that the device commands contained in the configuration field 210 have been successfully processed by the Command Interpreter 406.

A person skilled in the art will appreciate that the Profile Table 176 format described above is in the context of the described embodiment and is not a limiting aspect of the invention. Depending on a particular application, parameters or fields may be added to or removed from the event profile entries.

Profile Manager

Figure 5:
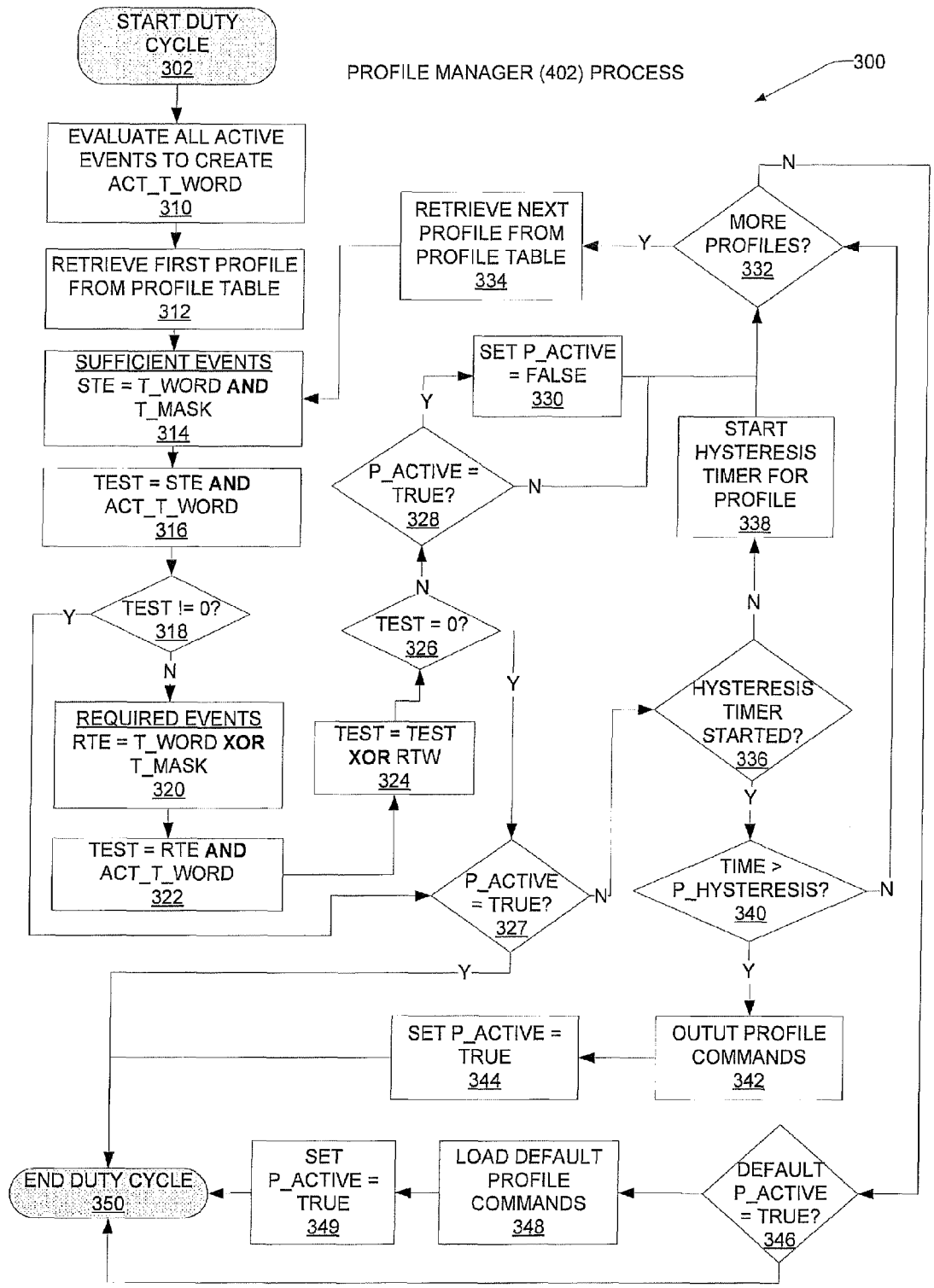
FIG. 5 is a flowchart illustrating the operation of a Profile Manager process running as a module of the System Software shown in FIG. 3.

Referring now to FIG. 5, operation of the Profile Manager 402 process according to one embodiment of the invention is shown in more detail at 300. A person skilled in the art will appreciate that a variety of methods and techniques may be used to implement the Profile Manager 402 process described herein. The process description provided below describes the implementation according to one embodiment of the invention and is not a limiting factor thereof. The operation of the Profile Manager 402 process begins at the start of the duty cycle as shown at block 302. A person skilled in the art will appreciate that the frequency of duty cycles may depend on a number of factors such as hardware components used, types of inputs/outputs processed, and the complexity of the locator device 10. In one embodiment of the invention, a duty cycle begins every 0.1 seconds, i.e., at a frequency of 10 Hz. Upon the start of the duty cycle, block 310 directs the microprocessor 100 to evaluate all currently occurring events to create an ACT_T_WORD. After creating the ACT_T_WORD at block 310, block 312 directs the microprocessor 100 to retrieve the first event profile entry from the Profile Table 176. As described above, the first event profile entry is the event profile entry with the highest number contained in the P_NUM field 202. After retrieving the profile entry, block 314 directs the microprocessor 100 to determine the sufficient events (STE) for the entry by performing a logical AND operation between the contents of the T_WORD field 204 and the T_MASK field 206. Block 316 then directs the microprocessor 100 to test the contemporaneous occurring events by performing a logical AND operation between STE and ACT_T_WORD. At block 318, the microprocessor 100 is directed to check whether the result of operation at block 316 is equal to zero. If no, then the sufficient events are present, and the microprocessor 100 is directed at block 327 to check whether the event profile entry corresponds to the currently active event profile by checking whether the P_ACTIVE flag 214 of the event profile entry is equal to TRUE. If yes, then no further processing is required and the microprocessor 100 is directed to end the duty cycle at block 350.

Referring still to FIG. 5, if, at block 327, the P_ACTIVE flag 214 is determined to be equal to FALSE, block 336 directs the microprocessor 100 to check whether the hysteresis timer for the event profile entry has been started by checking if the TIMER_START field 212 of the event profile entry contains a valid timestamp. If the hysteresis timer has not yet been started, block 338 directs the microprocessor 100 to start the hysteresis timer for the event profile by writing the current time into the TIMER_START field 212 of the selected event profile entry. Once the hysteresis timer has been started at block 338, the microprocessor 100 is directed to block 332, the operation of which shall be described in further detail below.

Referring still to FIG. 5, if, at block 336, it is determined that the hysteresis timer for the profile entry has been started, block 340 directs the microprocessor 100 to check whether the time elapsed since the start of the hysteresis timer is greater than the hysteresis time defined in the P_HYSTERESIS field 208 of the selected event profile entry. If the elapsed time is greater than the value of the hysteresis time, block 342 directs the microprocessor 100 to forward the device commands contained in the COMMANDS field 210 of the event profile entry to the Command Interpreter 406 via the command output 422 described above in reference to FIG. 3. Once the device commands have been successfully implemented by the Command Interpreter 406, block 344 directs the microprocessor 100 to set the P_ACTIVE flag 214 in the event profile entry to TRUE and block 345 directs the microprocessor 100 to reset TIMER_START field 212 to 0. The microprocessor 100 is then directed to end the duty cycle at block 350. If, at block 340, it is determined that the hysteresis timer has not yet expired, the microprocessor 100 is directed to block 332, the operation of which shall be described below.

Referring still to FIG. 5, if, at block 318, it is determined that the currently occurring events do not include any sufficient events, i.e., TEST was found to be equal to 0, block 320 directs the microprocessor 100 to determine necessary events (RTE) for the entry by performing a logical XOR operation between the contents of the T_WORD field 204 and the T_MASK field 206 of the currently selected event profile entry. Once RTE has been determined, block 322 directs the microprocessor 100 to test the currently occurring events by performing a logical AND operation between RTE and ACT_T_WORD. Block 324 then directs the microprocessor 100 to check whether the result of the test is equal to RTE by performing a logical XOR operation between TEST determined at block 322 and RTE determined at block 320. At block 326 the microprocessor 100 is directed to check if the result of the operation at block 324 is equal to 0. If so, the microprocessor 100 is directed to block 327 and so on as has been described above. If, at block 324, it is determined that the necessary events are not present, block 328 directs the microprocessor 100 to check whether the currently selected event profile is also the currently active event profile by checking if the P_ACTIVE flag 214 in the event profile entry is set to TRUE. If so, then the currently active event profile should no longer be active because neither the sufficient, nor the necessary events required by its trigger are present. Thus, if at block 328 it is determined that the currently active event profile should no longer be active, block 330 directs the microprocessor 100 to set the P_ACTIVE flag 214 in the currently selected event profile to FALSE. In either situation, if the currently active event profile had to be deactivated at block 330 or, if the currently selected event profile is not the active event profile, the microprocessor 100 is directed to block 332, the operation of which will be described in further detail below.

Referring still to FIG. 5, the operation of block 332 and connected blocks is described in further detail. Block 332 directs the microprocessor 100 to check whether there are more event profile entries contained in the Profile Table 176. If so, then block 334 directs the microprocessor 100 to retrieve the next event profile entry from the Profile Table 176. The next event profile entry will have a number contained in P_NUM field 202 that will be smaller than the contents of the P_NUM field of the previously selected event profile entry. Once the next event profile entry is retrieved, the microprocessor 100 is directed to repeat procedure contained in blocks 312 through 350 as described above. If, at block 332, it was determined that there are no more non-default event profiles contained in the Profile Table 176, by, for example, checking if the contents of the P_NUM field 202 are equal to 1, block 346 directs the microprocessor 100 to check whether the P_ACTIVE flag 214 in the default event profile is equal to TRUE. If so, then the default event profile is already active and the microprocessor 100 is directed to end the duty cycle at block 350. If, at block 346, it is determined that the default event profile is not currently active, block 348 directs the microprocessor 100 to forward the device commands contained in the COMMANDS field 210 of the default event profile entry to the Command Interpreter 406 via the command output 421 as described above in reference to FIG. 3. Once the device commands have been accepted by the Command Interpreter 406, block 349 directs the microprocessor 100 to set the P_ACTIVE flag 214 in the default event profile entry to TRUE and the microprocessor 100 is directed to end the duty cycle at block 350.

Profile Configuration Tool

Figure 6:
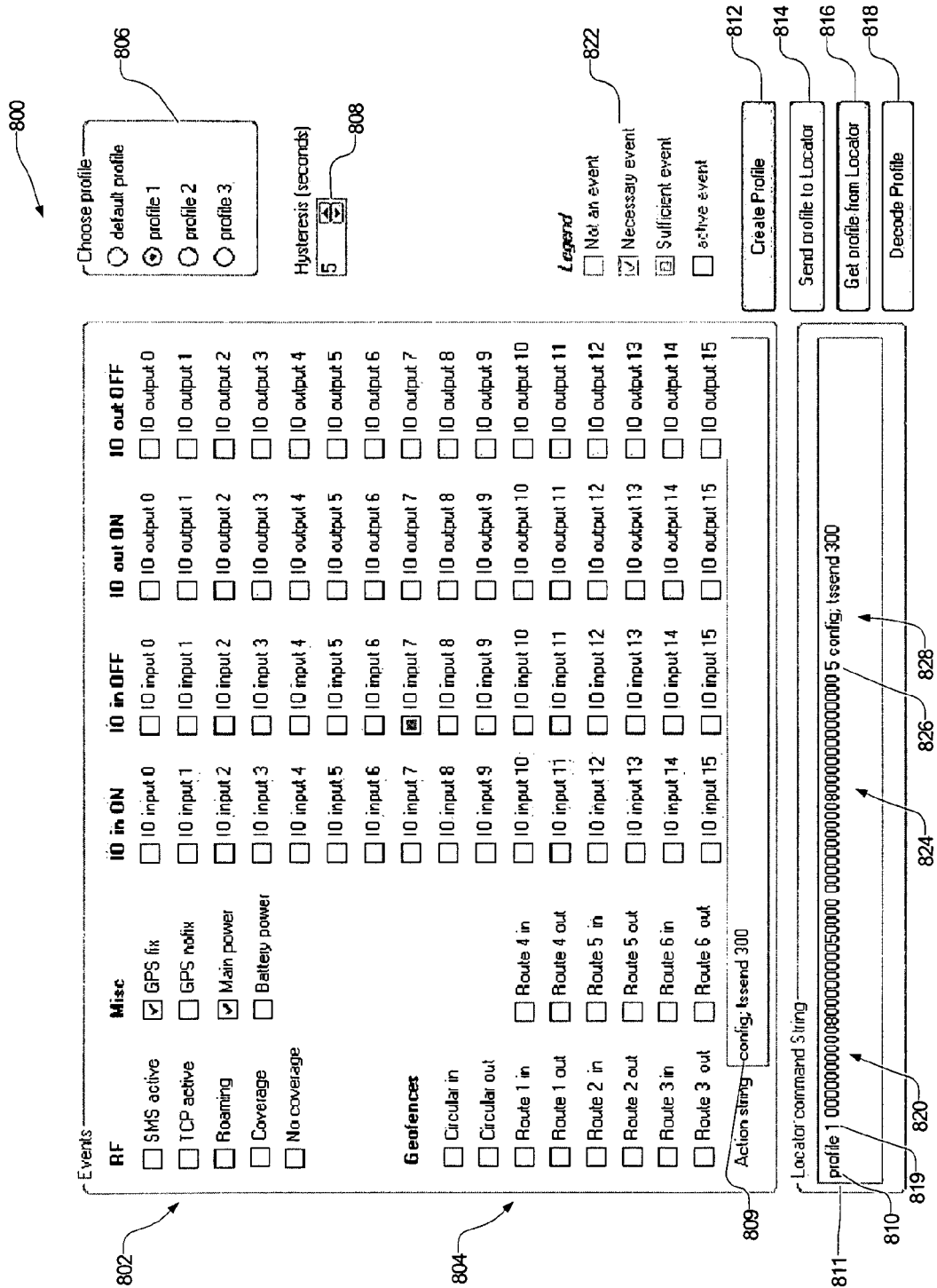
FIG. 6 is an illustration of a software profile configuration tool according to one embodiment of the invention.

Referring to FIG. 6, in accordance with one embodiment of the invention, a software profile configuration tool is shown generally at 800. The profile configuration tool 800 can be used to add event profile entries to the Profile Table 176 by automatically generating a device command which will add an event profile entry to the table. The profile configuration tool 800 can be run on a PC connected to the locator device 10 via the primary serial connection 134 or on a customer PC 20 connected to the Management System 18 via the Internet 16. A user operating the profile configuration tool 800 selects an event profile to be configured by selecting an appropriate radio-button from the list of available event profiles 806. A person skilled in the art will appreciate that the number of event profiles is arbitrary and generally depends on the amount of memory and type of microprocessor 100 installed in the locator device 10. Having selected an event profile to configure, the user can define contents of the T_WORD field 204 and the T_MASK field 206 of the selected entry by clicking on a plurality of checkboxes 802 and 804, which represent events previously illustrated in Table 1. As shown in a legend 822, an unchecked checkbox indicates that an event is not used in the profile, a checkbox with a checkmark indicates that the event is a necessary event, and a checkbox with a filled square indicates that the event is a sufficient event. In a field 808, the user is able to select a value of the P_HYSTERESIS field 208 for the entry. Finally, in a textbox 809, the user is able to enter device commands which will be stored in the COMMANDS field 210 in the entry. Once the user selects events and edits various fields described above, a resulting event profile device command 810 will be generated in a textbox 811 upon the user clicking on a Create Profile button 812. The resulting event profile device command 810 contains the event profile number at 819, the T_WORD at 820, the T_MASK at 824, the P_HYSTERESIS at 826 and COMMANDS at 828. Upon specifying all of the needed event profile parameters, the user can use a Send Profile button 814 to upload the event profile to the locator device 10. A person skilled in the art will appreciate that functionality disclosed herein is not limited to uploading an event profile to a single locator device 10. Rather, by integrating the profile configuration tool 800 with the Management System 18, a single event profile may be simultaneously uploaded to a plurality of locator devices managed by the Management System.

Still referring to FIG. 6, the profile configuration tool further provides functionality enabled by buttons 816 and 818. A Get Profile button 816 allows a user to download an event profile selected in field 806 from the locator device 10. A Decode Profile button 818 allows the user to translate the event profile downloaded via the Get Profile button 816 into a graphical representation in fields 802, 804, 808 and 809.

Examples

In one example, the locator device 10 and a specifically configured event profile are used to provide a truck driver with an audible and visual alarm when the driver exceeds a location-based speed limit defined by a truck operator. Thus, while the truck is located in city limits, the driver must maintain a speed below 50 km/h. However, outside of the city limits, the driver is allowed to maintain a speed of up to 80 km/h. Whenever a driver exceeds the speed appropriate for the truck's location, an audible alarm is sounded, a visual indicator is lit, and the locator device 10 sends a report of the incident to the Management Server 18 from where it can be accessed by or automatically reported to the truck operator. For the sake of explanation it is assumed that the speed-threshold notification feature is a function implemented on the locator device 10, specifically, certain configuration parameters in the device configuration 172 define the threshold speed limit and the digital I/O outputs 143 which are turned on to activate the audio-visual alarms. Furthermore, for the sake of explanation, it is also assumed that the city limits are defined by a polygon geofence 1 which geographically encloses the city. To change the threshold speed limit, assuming that the default location of the truck is within the city limits, a 'rural' event profile is defined. This trigger for this event profile is a single necessary event—event #7, crossing out of geofence 1, i.e., leaving the city limits. There is also a single command associated with this event profile—to change the configuration parameter corresponding to the threshold speed limit to 80 km/h. Thus, when an event is generated indicating that the truck has left the city limits, this event profile causes the locator device 10 to automatically reconfigure itself to now only report speed limit violations when the speed exceeds 80 km/h. As soon as the truck crosses back into the city limits, the event #7 is no longer occurring, and thus the default event profile is loaded. A command contained in the default event profile reconfigures the locator device 10 to once again set the threshold speed limit to 50 km/h.

In another example, an event profile addresses a situation when a truck-and-trailer with the locator device 10 is parked in a storage yard or on a street. The trigger for this event profile (combination of T_WORD and T_MASK described above) consists of either two necessary events—event #5, indicating that the vehicle with the locator device 10 has crossed a geofence associated with physical area of the storage yard, and event #21, being physical input #1 is ON, indicating that a trailer is connected; or one sufficient trigger—event #26, being physical input #5 is ON, indicating that an alarm system has been armed. The hysteresis time for activation of this event profile is 0 seconds indicating that the event profile will become active as soon as all of the sufficient or necessary events are detected. As soon as the truck and trailer are parked in the yard or the alarm system armed, it is desired that the locator device 10 switch itself to an energy-saving passive monitoring mode. Specifically, the device commands associated with this event profile define actions—placing the locator device 10 into "sleep mode", and configuration parameters—changing reporting interval to once in 6 hours and enabling monitoring of digital inputs associated with trailer door opening or the alarm system being tripped. In accordance with the operation of the Profile Manager 402 described above, once the necessary events are detected and the device commands implemented by the Command Interpreter 406, the P_ACTIVE flag for this event profile is set to TRUE and remain so until one or more of the necessary events or all sufficient events become inactive.

In another example, two event profiles are used to address a situation where a vehicle in which the locator device 10 is installed is being towed. Two event profiles are defined: a 'parked' profile and a 'towed' profile. For the parked profile, the triggers are defined by two necessary events: event #50—physical input 14 is OFF, corresponding to vehicle ignition being OFF; and event #12—GPS fix established. The parked event profile has a hysteresis of 180 seconds to make sure that the event profile does not become active if the vehicle merely stalls. The device commands associated with the parked profile define actions—placing the locator device in intermittent sleep mode, to wake up every 10 minutes to check conditions, and configuration parameters—configuring a security circular geofence and changing reporting interval to every 10 minutes to coincide with the locator device 10 waking up. Therefore, when a vehicle is parked and turned off, the parked event profile becomes activated, and the actions and configurations parameters described above are implemented. The towed event profile reconfigures the locator device 10 when the vehicle it is installed in is being towed outside of the security geofence—for example, it is being transported out of the city instead of being merely towed to an impound lot. The trigger for the towed event profile is defined by three necessary events: event #50 and event #12—same as for the parked profile, and event #5 indicating that the vehicle has crossed out of the circular geofence. The device commands associated with the towed profile define actions—wake up and report that vehicle that vehicle has left the circular geofence, and configuration parameters—change location reporting frequency to once every 15 seconds to allow vehicle to be initially located.

In another example, an event profile is used to allow the fleet operator to save communication costs by using a cheaper GPRS network whenever possible and only switching to the expensive satellite network only when the GPRS network is unavailable. The trigger for this event profile is defined by two sufficient events—event #1 indicating that a PPP link with a wireless modem (reported by the wireless driver 410) is down, or event #2 indicating the PPP link is up, but only SMS communications to the Management System 18 are available, i.e., only a GSM network is available. A hysteresis value of 60 seconds is associated with the event profile to avoid 'flapping' between connections when the problem is transient. The device commands associated with this event profile define several configuration parameters needed to reconfigure the locator device 10 to connect to the Management System 18 via the satellite modem 146 connected to the secondary serial connection 136 as described above. Naturally, as soon as these events are no longer contemporaneously occurring, the trigger for this event profile can no longer be satisfied, thus, a default event profile, which reconfigures the locator device to once again use the GPRS network, is activated.

In another example, an event profile can be configured where the trigger is a combination of Virtual Input and Virtual Output events. These events are defined in the device configuration 172 as mapping a function of the vehicle bus interface 114 to a standard input or output event. For example, where a functionality of a vehicle bus provides reporting of an engine's revolutions per minute (RPM), the locator device 10 may be configured to map a threshold RPM value to a Virtual Input #1 going ON or OFF depending on whether the reported value is above or below a threshold. A similar mapping, but this time to a virtual output, can be done for a function of a vehicle bus system that accepts inputs from the locator device 10. As above, the triggers which comprise these events can be used to correspond to actions or to reconfigure the locator device 10, including reconfiguring of the mapping described in this example.

To facilitate explanation of the novel aspects of this invention, a number of examples of operation of the locator device 10 generally and of the event profiles specifically were provided above. However, the invention is not intended to be limited to the specific form set forth herein, but on the contrary, it is intended to cover such alternatives, modifications, and equivalents, as can be reasonably included within the spirit and scope of the invention as defined by the appended claims.

I claim:

1. A method of dynamically operating a locator device, comprising the steps of:
   a. defining a plurality of events where each of said events represents an operational condition of said locator device;
   b. defining a plurality of triggers where each of said triggers is a dynamically configurable contemporaneously occurring combination of said events;
   c. defining a plurality of event profiles where each of said event profiles is a user-configurable dynamic association between i. one of said triggers; and
ii. a dynamically configurable set of device commands;
d. responding to a contemporaneously occurring subset of said events by evaluating said contemporaneously occurring subset of said events against said triggers of each of said event profiles;
e. activating one of said event profiles by processing said set of device commands corresponding to said event profile whenever said contemporaneously occurring subset of said events corresponds to said trigger of said event profile;
wherein said set of device commands changes a configuration parameter of said locator device.

2. The method of claim 1, wherein said set of device commands also causes said locator device to perform an action.

3. The method of claim 2, wherein said user-configurable dynamic association is implemented using Boolean logic.

4. The method of claim 2, wherein said user-configurable dynamic association is implemented using any form of combinatorial, sequential or associative logic.

5. The method of claim 2, wherein one of said events represents said locator device being located relative to a defined geographical area.

6. The method of claim 2, wherein one of said events represents said locator device successfully receiving location information from GPS satellites.

7. The method of claim 2, wherein said trigger is implemented by a combination of a trigger word and a trigger mask, wherein:
    a. said trigger word represents a subset of said events against which said contemporaneously occurring subset of said events is evaluated; and
    b. said trigger mask represents which of said subset of events is sufficient for causing the activating of said one event profile and which of said subset of events is necessary for causing the activating of said one event profile.

8. The method of claim 2, wherein said responding further includes performing Boolean operations between said contemporaneously occurring subset of said events and said trigger word and said trigger mask which comprise said trigger.

9. A dynamically operable locator device comprising:
a) a definition of a plurality of events where each of said events represents an operational condition of said locator device;
b) a definition of a plurality of triggers where each of said triggers is a dynamically configurable contemporaneously occurring combination of said events;
c) a definition of a plurality of event profiles where each of said event profiles is a user-configurable dynamic association between:
    i) one of said triggers; and
    ii) a dynamically configurable set of device commands;
d) means for responding to a contemporaneously occurring subset of said events by evaluating said contemporaneously occurring subset of said events against said triggers of each of said event profiles;
e) means for activating one of said event profiles by processing said set of device commands corresponding to said event profile whenever said contemporaneously occurring subset of said events corresponds to said trigger of said event profile;
wherein said set of device commands changes a configuration parameter of said dynamically operable locator device.

10. The dynamically operable locator device of claim 9, wherein said set of device commands causes said dynamically operable locator device to perform an action.

11. The dynamically operable locator device of claim 9, wherein said set of device commands causes said dynamically operable locator device to change one or more of said configuration parameters and perform one or more actions.

12. The dynamically operable locator device of claim 9, wherein said user-configurable dynamic association is implemented using Boolean logic.

13. The dynamically operable locator device of claim 9, wherein said user-configurable dynamic association is implemented using any form of combinatorial, sequential or associative logic.

14. The dynamically operable locator device of claim 9, wherein one of said events represents said dynamically operable locator device being located relative to a defined geographical area.

15. The dynamically operable locator device of claim 9, wherein one of said events represents said dynamically operable locator device successfully receiving location information from GPS satellites.

16. The dynamically operable locator device of claim 9, wherein said trigger is implemented by a combination of a trigger word and a trigger mask, wherein:
    a. said trigger word represents a subset of said events against which said contemporaneously occurring subset of said events is evaluated; and
    b. said trigger mask represents which of said subset of events is sufficient for causing the activating of said one event profile and which of said subset of events is necessary for causing the activating of said one event profile.

17. The dynamically operable locator device of claim 9, wherein said responding further includes performing Boolean operations between said contemporaneously occurring subset of said events and said trigger word and said trigger mask which comprise said trigger.

18. A method of dynamically operating a locator device associated with a vehicle, where the operation of the locator device is configurable and is used in conjunction with a GPS system, comprising the steps of:
a) defining a plurality of events wherein each event represents an operational condition of said locator device;
b) defining a plurality of triggers wherein each trigger is a dynamically configurable contemporaneously occurring combination of a subset of said events and wherein said combination is implemented by
    i) defining the occurrence of a sufficient event to be an event for which, upon detection, causes the locator device to perform an action or to change its configuration;
    ii) defining the occurrence of necessary events to be two or more events which, upon detection of their simultaneous occurrence, causes the locator device to perform an action or to change its configuration;
c) defining a plurality of event profiles wherein each event profiles is a user-configurable dynamic association between:
    i) one said trigger; and
    ii) a dynamically configurable plurality of device commands wherein each device command instructs the locator device to perform an action or to change the locator device configuration;
d) detecting the occurrence of one said trigger and responding thereto by activating the associated event profile.

19. The method of claim 18 performed in conjunction with a geofence, comprising the steps of:
- a) defining a "crossing geofence" event to be the crossing of the geofence boundary by the vehicle;
- b) defining a first "speed event" profile with a first speed limit;
- c) defining a second "speed event" profile with a second speed limit that is higher than said first speed limit;
- d) defining the sufficient event as the occurrence of said crossing event;
- e) defining a "speed change" trigger to be the occurrence of said sufficient event;
- f) detecting said "speed change" trigger; and
- g) activating, upon the detection of said "speed change" trigger, said second event profile.

20. The method of claim 18, in conjunction with a storage geofence boundary and an alarm system associated the vehicle, comprising:
- a) defining an "alarm system armed" event to be the arming of an alarm system;
- b) defining a "within storage yard geofence" event to be the crossing of the storage yard geofence boundary by the vehicle;
- c) defining a "trailer connected" event to be the connecting of a trailer to the vehicle;
- d) defining a trigger to be the occurrence of the sufficient event of "alarm system armed" event or the occurrence of two required events of {"within storage geofence" event and 'trailer connected" event};
- e) defining the "sleep mode" action to be placing of the locator device into an energy-saving mode.

21. The method of claim 18, in conjunction with a geofence boundary, comprising:
- a) defining a "parked" event profile to be the condition of the vehicle having the ignition off and the establishment of a GPS fix;
- b) defining a "towed" even" profile to be the condition of the vehicle being towed;
- c) defining a "crossing geofence" event to be the crossing of the geofence boundary by the vehicle;
- c) defining a "towed" trigger to be the occurrence of all required events of "parked" event and "crossing geofence" event.

22. The method of claim 18, comprising:
- a) defining a "satellite" event profile to be the condition of changing GPS satellite links;
- b) defining a "PPP link down" event;
- c) defining a "PPP link up but only SMS" event;
- b) defining a trigger to be the occurrence of one sufficient event from {"PPP link down" event, a "PPP link up but only SMS" event}.

23. The method of claim 18, wherein one said trigger is defined in terms of detecting a virtual input from a diagnostic system of the vehicle.

* * * * *